United States Patent [19]

Holmes

[11] 4,373,608
[45] Feb. 15, 1983

[54] TUNED SOUND BARRIERS

[75] Inventor: David G. Holmes, Schenectady, N.Y.

[73] Assignee: General Electric Company, Schenectady, N.Y.

[21] Appl. No.: 105,599

[22] Filed: Dec. 20, 1979

[51] Int. Cl.³ .................. H02K 5/24; F16F 7/00; G10K 11/16; H01F 15/02
[52] U.S. Cl. .................. 181/202; 181/208; 181/286; 336/100
[58] Field of Search ........... 181/201, 202, 208, 210, 181/284, 286, 288, 290–293, 295; 55/144–145; 336/100

[56] References Cited

U.S. PATENT DOCUMENTS

| 1,758,808 | 5/1930 | Sersen et al. ............ 181/284 X |
| 2,541,159 | 2/1951 | Geiger .................... 52/144 X |

FOREIGN PATENT DOCUMENTS

| 675132 | 12/1963 | Canada .................... 181/202 |
| 2017438 | 11/1971 | Fed. Rep. of Germany ...... 181/284 |
| 2229420 | 6/1972 | Fed. Rep. of Germany ...... 181/208 |

OTHER PUBLICATIONS

J. P. Den Hartog, *Mechanical Vibrations*, 4th Edition, New York: McGraw—Hill Book Co., Inc., (1956), pp. 87–93.

Primary Examiner—L. T. Hix
Assistant Examiner—Thomas H. Tarcza
Attorney, Agent, or Firm—Charles E. Bruzga; James C. Davis, Jr.; Marvin Snyder

[57] ABSTRACT

A tuned sound barrier for machines which radiate sound primarily at a few constant, discrete frequencies includes an array of mechanical resonators distributed over the surface of a sound barrier. Each resonator of the array is tuned to present a high mechanical impedance to transmission of mechanical vibration at one of the discrete frequencies emitted by the source machine. The tuned sound barrier may be either a free-standing sound barrier or an attachment to a housing for the machine.

13 Claims, 10 Drawing Figures

TUNED SOUND BARRIERS

BACKGROUND OF THE INVENTION

This invention relates to tuned sound barriers for machines such as electrical transformers, which radiate sound at a few constant, discrete frequencies. The sound barrier of the instant invention is tuned to block transmission of sound at the particular discrete frequencies emitted by the machine within the sound barrier.

The noise radiated by electrical machines such as power transformers has two distinct sources. One source is the cooling fans generally employed with such machines: the cooling fans produce broadband noise, along with some blade passage tones. The second source is the transformer core, the core noise is tonal, with components at twice line frequency, i.e., 120 Hz, and its harmonics. The dominant noise source is the purely tonal noise coming from the core with tones at 120 Hz, 240 Hz, 360 Hz, etc. These low frequency tones are very strong, and dominate the total audible transformer noise, despite the reduced sensitivity of the human ear to low frequencies. In a power transformer, the source of these tones is magnetostrictive vibration of the core, which is coupled into the transformer case via the core support structure and other elements of the transformer, causing vibration of the housing surrounding the transformer at twice line frequency and harmonics thereof, which transmits the low frequency noise into the surrounding environment.

Several prior art attempts have been made to reduce transformer noise, all associated with considerable cost penalties. One method is to derate the transformer. By reducing the flux density in the core, the magnetostrictive forces in the core are reduced. Since it is the magnetostrictive forces which cause the core to vibrate at twice line frequency (120 Hz for a 60 Hz system), and its harmonics (240 Hz, 360 Hz, etc.), derating the transformer reduces the source of vibration. However, derating the transformer means that a larger and more expensive transformer is needed for a given system electrical requirement. Another prior art technique of noise control is to quarantine the transformer in the middle of a large compound. This method exploits the reduction in sound intensity as sound propagates away from a source. The reduction in sound intensity obtained is about 6 decibels for each doubling of distance, so that a significant reduction in noise levels at the boundary of the compound requires a large area. Yet another technique of noise control is to build an external barrier or block house around the transformer. Heavy weight masonary barriers or even complete enclosures can be effective sound barriers; however, at the low frequencies at which a transformer operates, a conventional barrier must be massive to be effective. If a partial barrier (i.e., a wall) is employed, it must be very high to eliminate sound diffraction over the top, and a complete block house poses problems of access to and reduced cooling of the equipment enclosed. Another technique is to employ close-fitting shells including various forms of double wall construction and close-fitting mechanically-isolated panels. These offer some degree of noise reduction, but add complexity and considerable cost. With the exception of derating the transformer, the prior art techniques operate by reducing transmission of sound between the source in the transformer and the listener and are indifferent to the frequency of the sound emitted by the source.

SUMMARY OF THE INVENTION

An object of the instant invention is to provide a sound barrier which takes advantage of the fact that a transformer radiates significant sound essentially at only twice line frequency and its harmonics, and that the line frequency remains constant to within a fraction of a percent. Accordingly, the object of the instant invention is to provide a tuned light-weight sound barrier effective at a few selected frequencies characteristic of the noise source.

Accordingly, the instant invention discloses a sound barrier in which a metallic sheet is disposed around the noise source, and a plurality of sound absorbers is uniformly distributed over the surface of the metallic sheet. Each of the plurality of sound absorbers is tuned to present a large mechanical impedance to the transmission of sound at a specific frequency. In an electrical system operating at 60 Hz, the sound barriers would be tuned to twice line frequency and its harmonics.

BRIEF DESCRIPTION OF THE DRAWINGS

The features of the invention believed to be novel and unobvious over the prior art are set forth with particularity in the appended claims. The invention itself, however, as to organization, method of operation and advantages thereof, may best be understood by reference to the following description taken in conjunction with the accompanying drawings in which:

DESCRIPTION OF THE PREFERRED EMBODIMENTS

Figure 1:
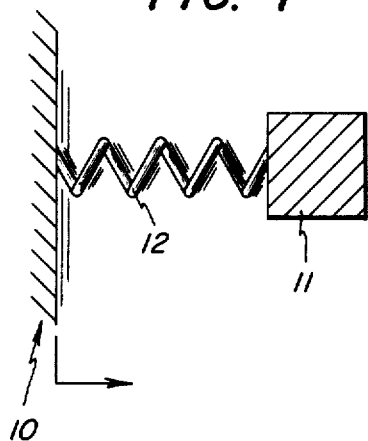
FIG. 1 illustrates a spring and mass damper system which demonstrates the principle of operation of the instant invention.
Figure 2:
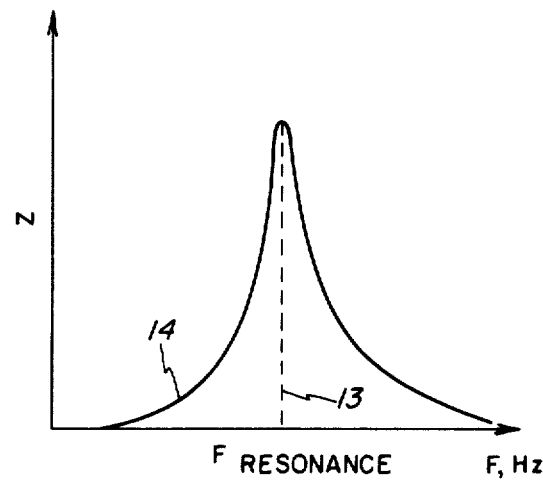
FIG. 2 is a graph of mechanical impedance presented by the absorber of FIG. 1 to vibration versus frequency.

The specific features of the instant invention described herein and shown in FIGS. 1-10 are merely examplary, and the scope of the invention is defined in the appended claims. Throughout the description and FIGS. 1-10, like reference characters refer to like elements of the invention.

As stated above, certain types of electrical equipment, such as high voltage transformers, emit noise due to magnetostrictive vibration of the transformer core. This noise is unusual in two respects, namely: it is entirely discrete frequency noise, and the discrete frequency components have frequencies (i.e., 120 Hz, 240 Hz, 360 Hz, etc.) which remain fixed to within a fraction of a percent. The instant invention employs a sound barrier tuned to effectively block sound transmission at the particular discrete frequencies at which such electrical equipment as transformers emits its predominant audible noise.

A model of a panel and absorber arrangement is illustrated in FIG. 1, in which a vibrating support 10 is attached to an absorber mass 11 by a spring 12. If the absorber 11 is forced into vibration by harmonic motion of the support 10, absorber 11 presents a mechanical impedance to transmission of vibration in the system to which it is attached. Mechanical impedance is defined as driving force amplitude divided by drive point velocity. The impedance characteristic of the system shown in FIG. 1 is illustrated schematically in FIG. 2. At frequencies both low and high compared to a resonant frequency (shown at dashed line 13) of the absorber and spring combination, the absorber presents negligible mechanical impedance to transmission of mechanical vibration as shown by the curve 14. At the resonant frequency, the mechanical impedance presented by the absorber system is very high, and is limited only by the residual damping in the absorber. Damping in the absorber system is produced by internal friction in the system tending to reduce the amplitude of vibration. At the resonant frequency, the high impedance of the absorber acts to block transmission of the vibratory motion of the system to which it is attached.

The effectiveness of an array of resonators in increasing the mechanical impedance of a panel is stated by the formula $$R = Z_1/Z_o = \sigma/\eta$$

where R = the ratio of the panel impedance with resonators ($Z_1$) to the panel impedance without resonators ($Z_o$), $\sigma$ is the ratio of the effective resonator mass to the panel mass and $\eta$ is the damping loss factor of the resonators. For the cantilever resonators as described herein, the effective resonator mass can be about 60% of the actual resonator mass. A reasonable damping loss factor, $\eta$ is in the range of 0.01 to 0.02. Thus, adding resonators having an actual mass of 20% of the bare panel will increase the panel impedance ten fold (giving a 20 decibel reduction in radiated sound). The vibration of the resonators will not be a significant source of sound radiation, since the resonators will act as very inefficient quadrupole sources.

An additional advantage of the cantilever construction for resonators is that subsequent resonant frequencies are well spaced from the fundamental resonant frequency. Theory indicates that the second resonance of such resonators is at a frequency about 6.3 times the frequency of the first resonance; therefore, a cantilever absorber tuned to a fundamental frequency of 120 Hz would have a second resonance near 750 Hz, well outside the range of interest, since a transformer emits essentially all of the radiated noise at lower frequencies. Therefore, the cantilever structure is ideally suited to sound absorption in transformers or similar electrical devices.

It is essential that the resonators be distributed uniformly over the panel wall. Attempts to use resonator simply as dynamic vibration absorbers to kill the vibration at "hot spots" (i.e., locations of maximum vibration) on a panel will fail, since the "hot spots" will simply move elsewhere on the panel. Therefore, to block vibration and not merely relocate it, the resonators must be disposed on the absorber wall such that the vibration is eliminated. The array of resonators must be dense enough so that their regions of influence overlap, thereby preventing vibration at locations not subject to resonator influence. Many smaller resonators are preferable to fewer large resonators, because the position of each resonator of an array of many small resonators can be selected so that influence zones of individual resonators overlap to limit vibration throughout the panel. A uniform distribution of resonators enables one to more nearly approach the maximum theoretical performance of such mechanical resonators.

Figure 3:
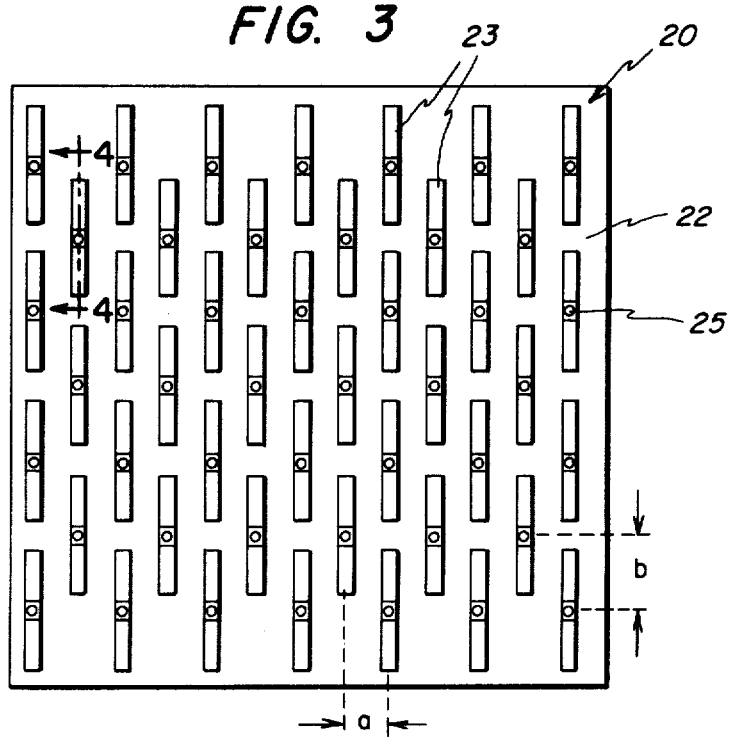
FIG. 3 is a schematic plan view of one wall of a tuned sound barrier of the instant invention.
Figure 4:
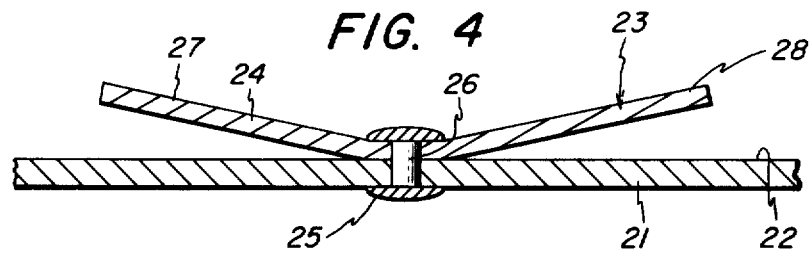
FIG. 4 is a cross-sectional view taken along line 4—4 of FIG. 3 of an individual absorber.

Employing the above analysis a tuned sound barrier such as is illustrated in FIGS. 3 and 4 is proposed. The tuned sound barrier 20 comprises a heavy gauge metallic plate 21 having vertical and horizontal dimensions established by the device to be enclosed. Attached to one major surface 22 of the metallic plate 21 is a plurality of mechanical paired cantilever resonators 23 disposed in a distributed array covering said plate 21. As shown in FIG. 4, each resonator 23 comprises a metal strip 24 attached to plate 21 by a rivet 25 which passes through plate 21 and the central regions 26 of the resonator 23. Each resonator 23 is shaped to have two cantilever wings 27, 28, extending from said central region 26 upwardly and outwardly from the plane of said second sheet to a position separated from said major surface 22 of plate 21.

As shown in FIG. 3, the major surface 22 of panel 20 is covered with a distributed array of resonators 23. The resonators 23 are illustrated as of uniform size; however, an array including resonators of several predetermined sizes each having a resonant frequency at the fundamental frequency of vibration of one of its harmonics could be employed for shielding a particular device. By selecting the shape and mass of each resonator, a fundamental resonance at a desired frequency may be obtained. Each of the paired cantilever resonators of an array may be so configured that the stamped cantilevers present high impedance at the fundamental vibration frequency or to a predetermined one of its harmonics at which significant noise is produced. Thereby, an array of resonators having a particular predetermined combination of resonance characteristics could be simultaneously effective at each of the source frequencies of the transformer.

Figure 5:
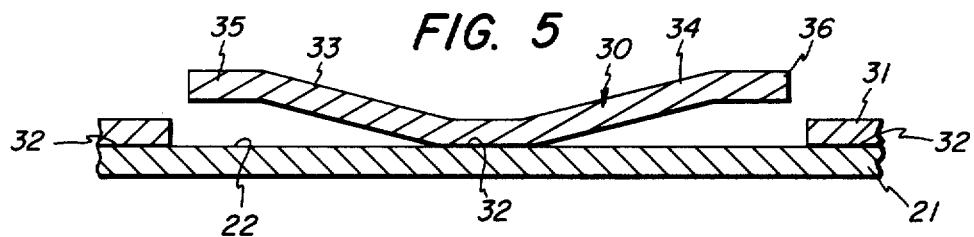
FIG. 5 is a cross-sectional view showing an embodiment of an absorber constructed according to the instant invention.

FIG. 5 illustrates an alternative embodiment of a resonator panel designed according to the instant invention. A plurality of paired cantilever beam resonators 30 is punched into a resonator plate 31. The resonator plate 31 is bonded by a layer 32 of an adhesive, such as a polymeric adhesive to backing plate 21. Each resonator 30 is stamped into the shape shown having wings 33, 34 with end sections 35, 36 extending generally parallel to plate 21. The shape shown or other shapes such as straight winged beams designed to have the desired resonance characteristics may be employed so long as the resonator end sections 35, 36 do not encounter the backing plate surface 22 when vibrating.

Figure 6:
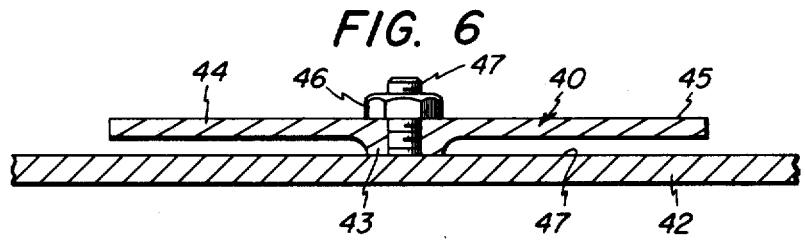
FIG. 6 is a cross-sectional view showing an alternative embodiment of an absorber constructed according to the instant invention.

FIG. 6 illustrates an alternative attachment technique for supporting cantilever resonators 40 on the major surface 41 of the barrier plate 42. One concern in using threaded fasteners for attachment of absorbers to a panel is that the bolt torque would probably influence the tuned frequency of the resonator. This could act to shift the resonant frequency of the absorber panel combination away from the specific frequency at which resonance is desired; namely, twice line frequency. A resonator 40 having a configuration such as that shown in FIG. 6 having a thicker root section 43 joining wings 44, 45 could be employed to limit the effect of bolt torque. Because of the additional stiffness at the root section 43, shifting of the resonant frequency of resonator 40 due to bolt torque applied to nut 46 during fastening to stud 47 welded to plate 42 would be minimized. Alternatively, the resonators could be attached by spot welding to the absorber panel surface provided welding effects upon resonator tuning are taken into consideration.

Figure 7:
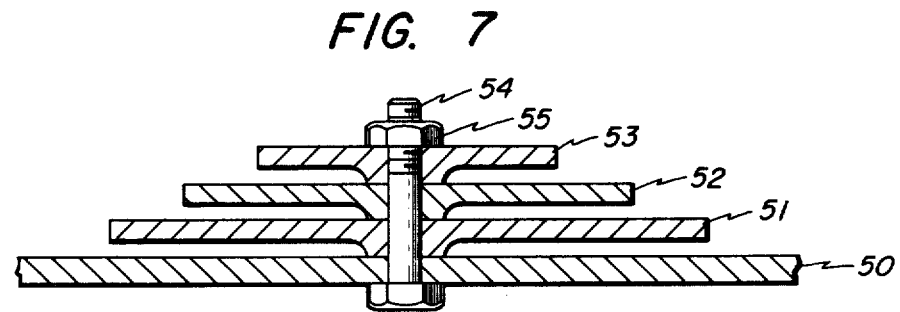
FIG. 7 is a cross-sectional view of an absorber combination constructed according to the instant invention.

FIG. 7 illustrates a resonator assembly attached to a backing plate 50. Resonators 51, 52 and 53, similar to the resonator shown in FIG. 6 are attached to plate 50 by a bolt 54 and nut 55. Each of the resonators 51, 52 and 53 is designed to have a resonance when included in the combination of resonators at one of the important noise frequencies (e.g., 120 Hz, 240 Hz, 360 Hz, etc.). By employing individual resonators, each tuned to a particular frequency, attached at the same location to the plate 50, each location has an effective absorber at each of the required frequencies. Any number of resonators could be employed to control sound as required by the device being shielded, so long as the overall combination performs noise reduction as required at the important frequencies.

Figure 8:
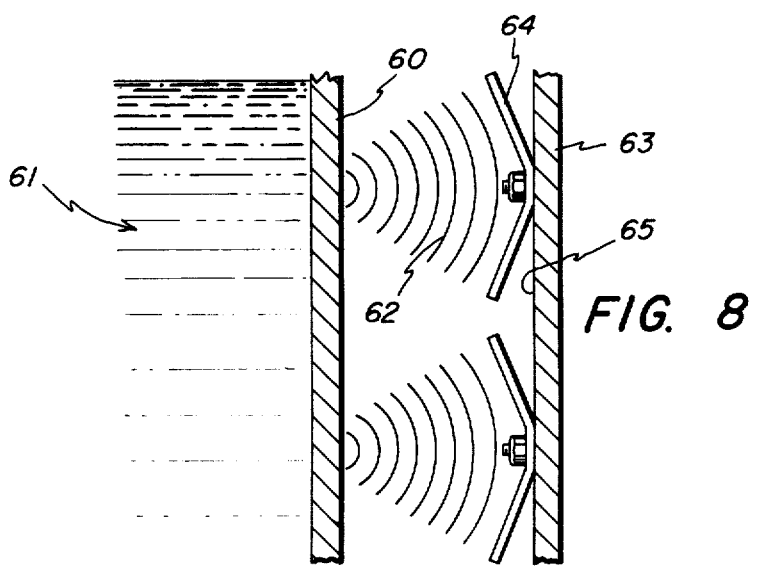
FIG. 8 is a schematic partial cross-sectional view showing an electrical device having an absorber panel designed according to the instant invention disposed adjacent thereto.

FIG. 8 illustrates a partial schematic view of a preferred embodiment of the instant invention. In an electrical device such as a transformer, the core is surrounded by a tank wall 60 in which oil 61 is placed as an insulator. The tank wall 60 is mechanically coupled to the core by the core support structure and the oil which transmit mechanical vibration to the tank wall, which then emits the vibration as sound waves shown by lines 62 into the surrounding air. Barrier 63 having resonators 64 provides means to block transmission of the sound energy directed outwardly by sound waves from wall 60 within the sound barrier 63, so that a significantly reduced sound intensity is transmitted to the air outside the sound barrier 63. With resonators 64 disposed on the interior surface 65 of panel 63, as shown in FIG. 8, the resonators 64 would be protected from damage, and a slight noise reduction is achieved, since the radiation of sound by resonators 64 into the ambient environment is eliminated. Therefore, this configuration would be favored where other considerations, such as clearance space around the tank wall, do not dictate that the absorbers be disposed on the exterior surface of the absorber panel.

Figure 9:
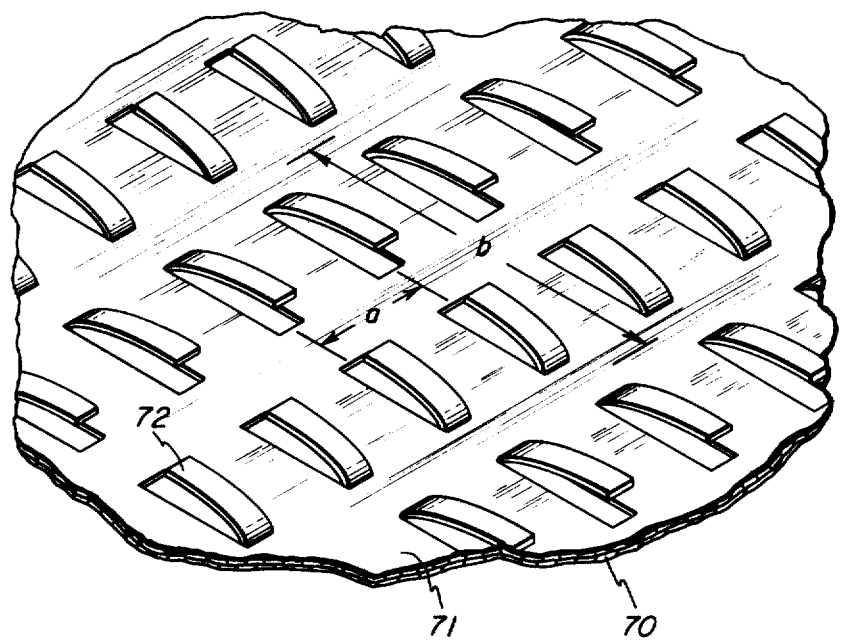
FIG. 9 is a schematic pictorial view illustrating an alternative arrangement of absorbers attached to a wall of a machine housing.

FIG. 9 illustrates an alternative embodiment of the resonator array of my invention. A tank wall 70 has an absorber plate 71 attached thereto by adhesive or welding. A plurality of resonators 72 are formed in plate 71 by punching to form a rectangular array of resonators 72 having their centers separated by distances a and b as shown. This embodiment eliminates the need to attach separate resonators to the tank wall, but requires that the tuning of the resonators be included as part of the design of absorber plate 71, and requires that the tuning of the resonators be accomplished prior to machine assembly.

To achieve maximum performance of the resonators as described hereinabove, the array of resonators must be distributed over the surface of the resonator plate such that the effect achieved is as nearly equivalent as possible to an infinite array of small resonators. If vibration of the wall surface is measured and the distances between nodal lines of vibration at particular frequencies are determined, the arrangement of resonators should be such that the spacing between them is much smaller than the typical distance between nodal lines. A mathematical approach to determining appropriate resonator spacing assumes that the distance between resonators is the same in each direction, i.e., a and b shown in FIG. 9 are assumed to be equal. Resonator spacing is defined as the square root of the area of the rectangle of the plate defined by four adjacent resonators, divided by the length of free bending waves in the plate. If the spacing is less than about a third of a wavelength, the mean vibration level of the plate is essentially at the asymptotic value of vanishingly small spacing. As the spacing increases, complex plate/resonator modes may be excited, resulting in response peaks which could deteriorate sound absorption performance. Therefore, the resonator spacing required would be determined by plate characteristics of the specific plate being used. A similar but somewhat more complex calculation can be made for offset rectangular arrays, as shown in FIG. 3. Although metal panels are illustrated herein absorber panels of structural plastics could also be employed.

Figure 10:
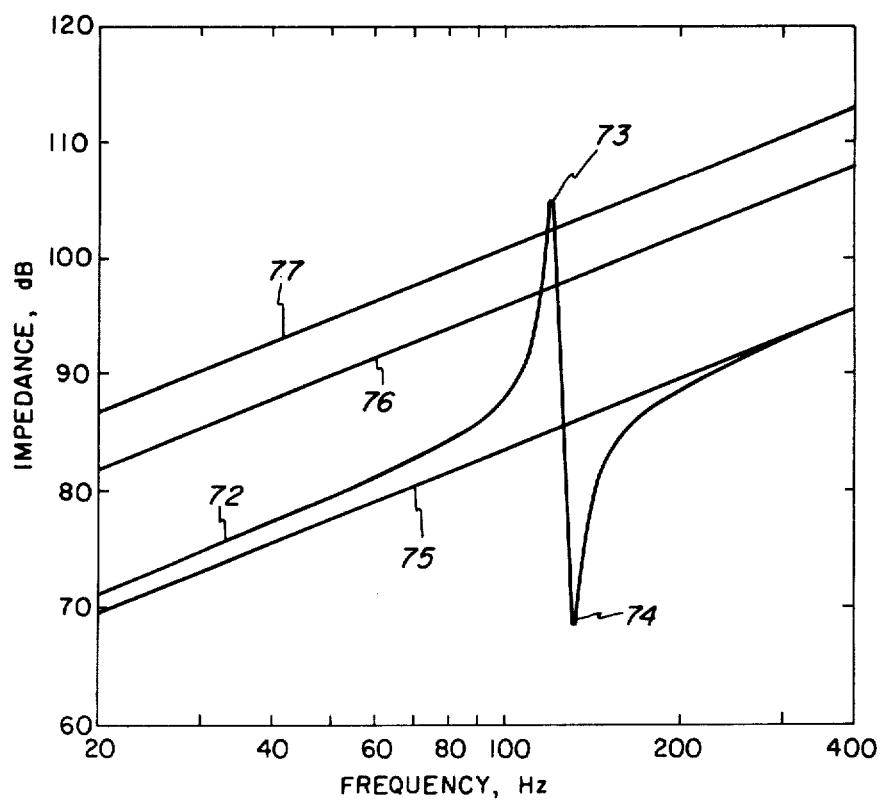
FIG. 10 is a graphical representation of mechanical impedance versus frequency for a particular embodiment of the instant invention.

A mathematically predicted impedance curve is shown in FIG. 10 for an 11 gage steel panel, with an array of absorbers attached directly to the panel having a total mass equal to 20% of the mass of the steel plate with an assumed loss factor $\eta$ of 0.02. The predicted response to the absorber combination is illustrated by line 72. The sharp impedance rise at 120 Hz, shown at 73 and the sharp impedance drop shown at 74 at about 130 Hz illustrates the principle of a tuned sound barrier. The critical design feature is the sharp impedance peak at 73, and the sharp drop at 74 presents no significant penalty, since the source emits very little noise at other than specifically twice line frequency and its harmonics. Line 75 illustrates the predicted impedance for the same steel plate without the absorbers. Line 76 illustrates the predicted impedance of a steel plate 0.5 inch thick, and line 77 illustrates the predicted impedance of a concrete wall 4 inches thick. As can clearly be seen, the instant invention takes advantage of the predicted specific response of an array of resonators to achieve effective sound absorption by tuning the absorbers to the known source frequencies.

In a sound transmission loss experiment the validity of the model was established. An array of resonators similar to those shown in FIG. 3 was attached to a 4'×4' 16 gage steel panel. The absorbers had a mass of 25% of the bare panel, and had a resonator frequency of 205 Hz. In an experiment to measure the sound transmission loss of the panel, the panel with absorbers had a sound transmission loss 16 dB greater than the transmission loss of the bare panel, at the frequency of 205 Hz.

BEST MODE

The best mode contemplated for a free-standing barrier would employ a barrier completely surrounding the noise source. The barrier has a plurality of small closely spaced resonators stamped into an absorber plate which is bonded to a backing plate completely surrounding the noise source, such as a high voltage transformer. For an absorber attached directly to the wall of a transformer or other electrical device, individual small resonators as shown in FIG. 6 would be employed in a closely spaced array attached to each wall of the transformer housing. In either case separate resonators tuned to the fundamental vibration frequency, 120 Hz, and its harmonics would be employed. In the free standing barrier, the separate resonators would be stamped in distinct locations. In the case of resonators attached directly to a housing, the individually tuned resonators could be separately attached or attached as a stack as shown in FIG. 7.

What is claimed is:

1. A tuned sound barrier for reducing the noise emitted by a vibrating source comprising:
   a barrier sheet disposed adjacent said source; and
   a plurality of resonators attached to and uniformly distributed over a major surface of said sheet; each one of said plurality of resonators being tuned to present to said barrier sheet a large mechanical impedance to vibratory motion of said barrier sheet at a specific frequency emitted by said source.

2. The apparatus of claim 1 wherein said barrier sheet comprises a metallic sheet and each of said plurality of resonators comprises a paired cantilever beam resonator rigidly affixed to said major surface of said sheet at approximately the midpoint of said beam.

3. The apparatus of claim 2 wherein said plurality of resonators has a total mass of about 10% to about 40% of the mass of said sheet.

4. The apparatus of claim 2 wherein said plurality of resonators are uniformly distributed over said major surface in a rectangular array.

5. The apparatus of claim 2 wherein said plurality of resonators are uniformly distributed over said major surface in a pair of offset rectangular arrays.

6. The apparatus of claim 2 wherein said metallic sheet comprises the outer wall of a high voltage transformer.

7. The apparatus of claim 1 wherein said plurality of resonators are welded to said major surface of said sheet.

8. The apparatus of claim 1 wherein said plurality of resonators are attached to said major surface by a nut threaded to a threaded stud directly welded to said sheet.

9. The apparatus of claim 2 wherein said plurality of sound absorbers comprises a first plurality of resonators tuned to be resonant at about 120 Hz, a second plurality of resonators tuned to be resonant at about 240 Hz, a third plurality of resonators tuned to be resonant at 360 Hz, and a fourth plurality of resonators tuned to be resonant at 480 Hz.

10. A tuned sound barrier for reducing noise emitted by a high voltage transformer operating at a predetermined line frequency comprising:
    a plurality of planar source barrier walls surrounding said transformer and disposed adjacent thereto;
    each of said barrier walls comprising a first planar metallic sheet and a second metallic sheet bonded to a major surface of said first sheet; and
    said second metallic sheet includes a plurality of paired cantilever resonators punched into said second sheet and projecting therefrom in a direction away from said first sheet, and each of said paired cantilevered resonators is tuned to present to said first sheet a large mechanical impedance to vibratory motion of said first sheet at a frequency of twice said line frequency or a harmonic frequency thereof.

11. The apparatus of claim 10 wherein said plurality of paired cantilever resonators comprises a first plurality of cantilever resonators having a resonant frequency of about 120 Hz; a second plurality of cantilever resonators having a resonant frequency of about 240 Hz; a third plurality of cantilever resonators having a resonant frequency of about 360 Hz, and a fourth plurality of cantilever resonators having a resonant frequency of 480 Hz.

12. The apparatus of claim 11 wherein each of said first, second, third and fourth pluralities of cantilever resonators are uniformly distributed over said second sheet.

13. The apparatus of claim 12 wherein each said plurality of resonators are uniformly distributed over the major surface of each of said sheets adjacent the outer wall of said transformer.

* * * * *